No. 713,966. Patented Nov. 18, 1902.
C. R. CRAIN, L. C. EVANS & H. E. DODSON.
GRAIN DRILL.
(Application filed June 25, 1902.)
(No Model.)
2 Sheets—Sheet 2.
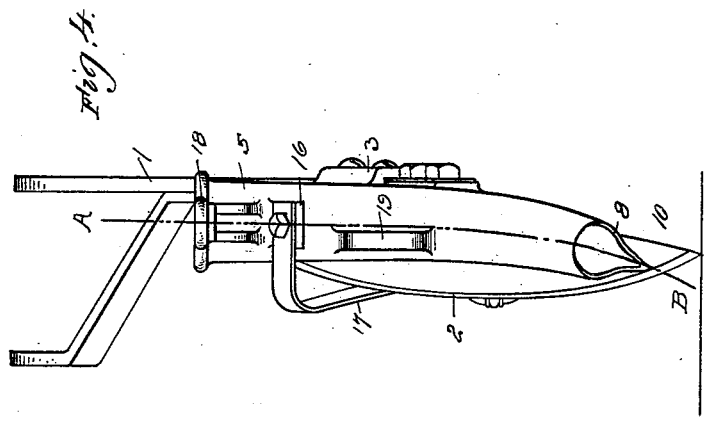
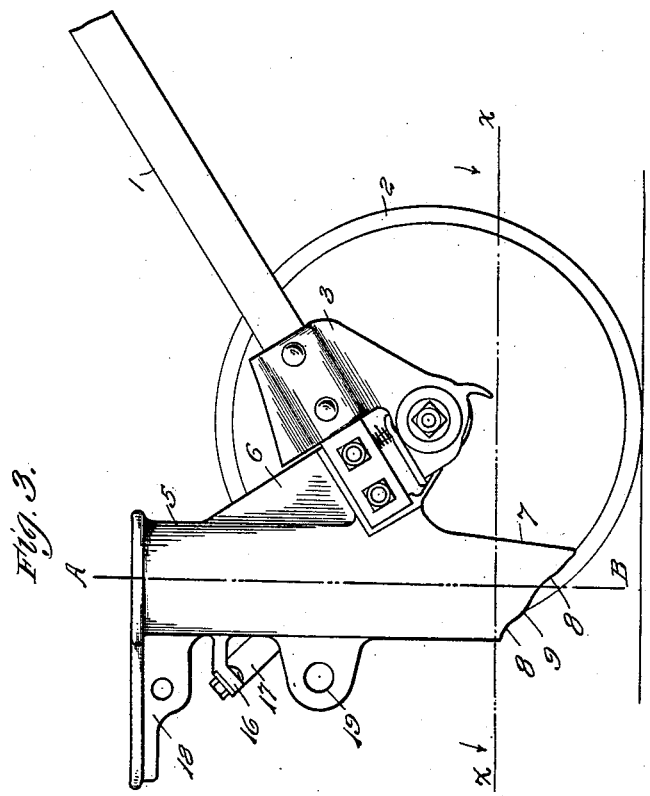
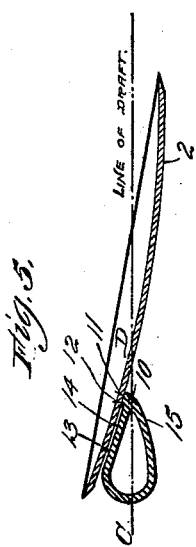
WITNESSES:
INVENTORS
ATTORNEY.

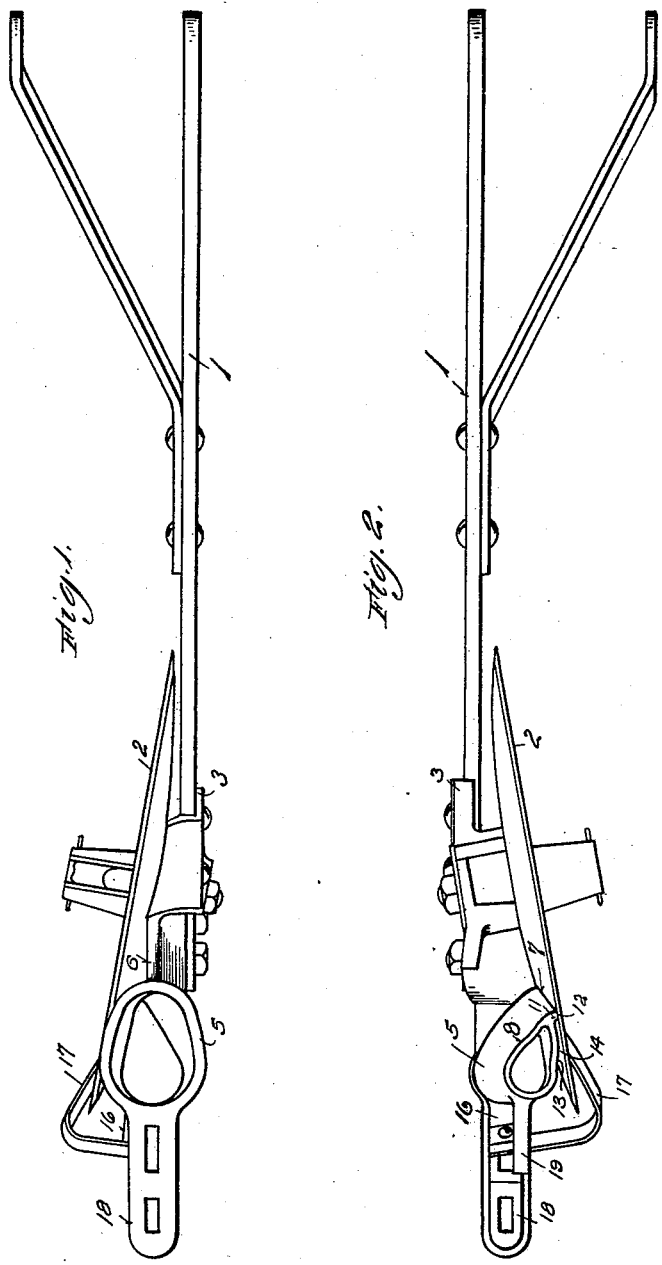

UNITED STATES PATENT OFFICE.

CHARLES R. CRAIN, OF MEADOW LAWN STATION, AND LOUIS C. EVANS AND HARRY E. DODSON, OF SPRINGFIELD, OHIO, ASSIGNORS TO P. P. MAST & COMPANY, OF SPRINGFIELD, OHIO, A CORPORATION OF OHIO.

GRAIN-DRILL.

SPECIFICATION forming part of Letters Patent No. 713,966, dated November 18, 1902.

Application filed June 25, 1902. Serial No. 113,072. (No model.)

*To all whom it may concern:*

Be it known that we, CHARLES R. CRAIN, residing at Meadow Lawn Station, D. S. & U. Railway, and LOUIS C. EVANS and HARRY E. DODSON, residing at Springfield, in the county of Clark and State of Ohio, citizens of the United States, have invented certain new and useful Improvements in Grain-Drills, of which the following is a specification, reference being had therein to the accompanying drawings.

This invention relates to grain-drills, and more particularly to a combined furrow-opening and seed-depositing device, and has for its object to provide a construction of this character wherein a furrow-opening disk is employed in which the grain or grain and fertilizer will be positively and evenly deposited in the furrow without coming into contact with the disk, thereby being scattered or carried around by the disk, and wherein clogging of the disk by adhesion of the soil or of the tube from the same cause or by clogging of the flow of the materials passing through the tube may be avoided.

To these ends our invention consists in certain novel features, which we will now proceed to describe and will then particularly point out in the claims.

In the accompanying drawings, Figure 1 is a plan view of a structure embodying our invention. Fig. 2 is an inverted plan view. Fig. 3 is a side elevation of the furrow-opening and seed-depositing devices. Fig. 4 is a rear elevation of what is shown in Fig. 3, and Fig. 5 is a plan section taken on the line *x x* of Fig. 3 and looking in the direction of the arrows.

In the said drawings, 1 indicates a drag-bar which may be of any suitable construction and by means of which the furrow-opening disk 2 is supported, this support being preferably effected by means of a clip 3, bolted to the drag-bar and carrying the trunnion on which the disk is mounted. The disk is a concavo-convex disk set at an angle to the line of draft, with its concave face forward and its convex face to the rear, as is usual in furrow-opening disks. In connection with this furrow-opening disk we employ a seed-depositing tube 5, which is located near the rear edge of the furrow-opening disk, as shown, being maintained in a fixed relation relatively to said disk and being preferably supported by means of a forwardly-extending web or plate 6, bolted to the rear end of the drag-bar. The mode of connecting the disk and seed-depositing tube to the drag-bar forms no part of our invention, however, and these connections may be effected in any suitable manner.

The depositing-tube 5 is of substantially the same width or diameter from front to rear as from the top to the bottom thereof, except that the lower part of the front edge of said tube is constructed with a slight rearward and downward inclination, as indicated at 7. The tube is slightly flattened laterally, so that its transverse diameter is less than its longitudinal diameter, and this transverse diameter decreases but very slightly toward the bottom of the tube. The median axis of the tube, which is indicated by the dotted line A B, is straight and substantially vertical when viewed from the side of the machine, as shown in Fig. 3, or, in other words, said median axis lies in a transverse plane, which is substantially vertical. Viewing the machine longitudinally, however, it will be observed that the median axis of the tube is curved or bent laterally as to the lower part of said tube, so as to have approximately the same curvature as the adjacent convex side of the disk, in close proximity to which said tube is located. The interior passage of said tube, which receives the conducting-tube from the seed-distributing devices and through which passage the grain and fertilizer are carried to the furrow, has smooth continuous walls without any shoulders, abrupt inclines, or projections of any kind and without any material constrictions of its main or body portion, so that neither the grain nor the fertilizer will be arrested in their descent nor permitted to accumulate and clog the passage through the tube. Both of the side walls of the tube extend downward an equal distance, and the lower end of the tube is formed upon an upward inclination from front to rear, the rear end of the tube-opening being considerably higher than the front end. This inclination is preferably in the nature of an upward and rearward concave or reëntrant curve 8, provided with a convex or salient curved portion 9 slightly in advance of the heel of the tube, and the tube and disk are preferably so located that this convex or salient curved portion 9 is located at the point where the edges of the tube and of the disk coincide, as shown in Fig. 3, the opening of the tube extending back of the said point in a continuation of the main reëntrant curve. The lower part of the tube is formed at its forward edge into an angle 10, and said lower part is so shaped internally that the major axis of its interior opening (indicated by the dotted line C D in Fig. 5) lies in the line of draft and not at an angle thereto. The inner edge of the angle 10 of the lower part of the tube lies against the disk, so as to be in slight or delicate contact therewith and act as a scraper to break up any particles of soil or mud adhering to the disk, thereby preventing the disk from becoming clogged or coated, while that portion of the side of the tube which is nearest the disk lies clear of or separated from the disk back of said edge, so as to form a clearance-space. The construction which we prefer for this purpose is that shown, in which said edge is provided with a rib 11, extending along the forward edge of the lower part of the tube and having a flat contact-surface 12 to bear against the disk, while the side of tube back of said rib recedes from and stands clear of the disk, as indicated at 13, thus forming the clearance-space 14. The other or outer side of the tube at the lower portion thereof diverges outwardly and rearwardly from the disk from the angle 10, so as to prevent any clogging or accumulation of weeds, trash, stubble, or soil on the outer surface of the tube.

It will be observed that we have provided a seed-depositing tube which is substantially straight in side elevation, but which is bent or curved when viewed from the front or rear of the machine, so as to have approximately the same curvature as the convex side of the disk. It will also be observed that the passage through this tube is without shoulders or constricted parts, so that the conducting-tube may move freely therein and the grain and fertilizer will pass freely therethrough without clogging. The downward and rearward inclination of the front edge of the tube (indicated at 7) prevents the accumulation of trash or other objectionable material at the front of the tube, and the structure of the exterior of the tube on one side is such as to keep the disk clear of mud and soil, while the construction on the other side is such as to throw off and prevent the accumulation of trash. The two sides of the tube are carried down to an equal extent, so that the discharge or outlet end of the tube prevents the grain from being thrown against or coming into contact with the disk. This is desirable for the reason that such contact often prevents equal distribution of the grain by reason of the deflection of the grain from its course by contact with the moving disk, and it also prevents the grain from adhering to the disk in case the latter is wet or muddy, whereby it might be carried around and deposited, if at all, in improper places and in unequal quantities. The upward and rearward inclination of the lower end of the tube insures a downward and rearward discharge of the grain only, and this upward and rearward inclination of the discharge-opening also prevents clogging of the lower end of the tube by avoiding the accumulation of soil therein.

We have shown the tube as provided with a lug 16 for the attachment of a scraper 17, which works upon and keeps clean the concave or forward side of the disk, and with the usual lugs 18 and 19 for the attachment of press-wheels or the covering-chains or the like.

We do not wish to be understood as limiting ourselves to the precise details of construction hereinbefore described and shown in the accompanying drawings, as it is obvious that these details may be modified without departing from the principle of our invention.

Having thus fully described our invention, what we claim as new, and desire to secure by Letters Patent, is—

1. In a grain-drill, the combination, with a revolving concavo-convex furrow-opening disk set at an angle to the line of draft, of a laterally-flattened depositing-tube in fixed relation to said disk, located back of the convex side and near the rear edge thereof, said tube being of substantially equal width throughout its length from front to rear, except for a slight rearward and downward inclination of the lower part of the front edge, the median axis of said tube being substantially straight and vertical when viewed from the side, or lying in a plane transverse to the line of draft, the lower part of the median axis of said tube being bent or curved laterally to approximately the same curvature as the adjacent convex side of the disk, said tube having an interior passage without inward projections or shoulders and without constrictions of the main part or body of said passage, and having an exclusively downward and rearward discharge-outlet at its lower end, substantially as described.

2. In a grain-drill, the combination, with a revolving concavo-convex furrow-opening disk set at an angle to the line of draft, of a laterally-flattened depositing-tube in fixed relation to said disk, located back of the convex side and near the rear edge thereof, said tube being of substantially equal width throughout its length from front to rear, except for a slight rearward and downward inclination of the lower part of the front edge, the median axis of said tube being substantially straight and vertical when viewed from the side, or lying in a plane transverse to the line of draft, the lower part of the median axis of said tube being bent or curved laterally to approximately the same curvature as the adjacent convex side of the disk, said tube having an interior passage without inward projections or shoulders and without constrictions of the main part or body of said passage, and having an exclusively downward and rearward discharge-outlet at its lower end, the lower part of said tube being formed at its forward edge into an angle one edge of which lies against the disk, the side of the tube rearward of said edge being clear of or separated from the disk to form a clearance-space, substantially as described.

3. In a grain-drill, the combination, with a revolving concavo-convex furrow-opening disk set at an angle to the line of draft, of a laterally-flattened depositing-tube in fixed relation to said disk located back of the convex side and near the rear edge thereof, said tube being of substantially equal width throughout its length from front to rear except for a slight rearward and downward inclination of the lower part of the front edge, the median axis of said tube being substantially straight and vertical when viewed from the side, or lying in a plane transverse to the line of draft, the lower part of the median axis of said tube being bent or curved laterally to approximately the same curvature as the adjacent convex side of the disk, said tube having an interior passage without inward projections or shoulders and without constrictions of the main part or body of said passage, and having an exclusively downward and rearward discharge-outlet at its lower end, the lower part of said tube being formed at its forward edge into an angle one edge of which lies against the disk, the side of the tube rearward of said edge being clear of or separated from the disk to form a clearance-space, and the other edge of said angle and the outer side of the tube diverging outwardly and rearwardly, substantially as described.

4. In a grain-drill, the combination, with a revolving concavo-convex furrow-opening disk set at an angle to the line of draft, of a laterally-flattened depositing-tube in fixed relation to said disk, located back of the convex side and near the rear edge thereof, said tube being of substantially equal width throughout its length from front to rear, except for a slight downward and rearward inclination of the lower part of the front edge, the median axis of said tube being substantially straight and vertical when viewed from the side, or lying in a plane transverse to the line of draft, the lower part of the median axis of said tube being bent or curved laterally to approximately the same curvature as the adjacent convex side of the disk, said tube having an interior passage without inward projections or shoulders and without constrictions of the main part or body of said passage, and having an exclusively downward and rearward discharge-outlet at its lower end, said lower end being formed for that purpose with an upward and rearward inclination, substantially as described.

5. In a grain-drill, the combination, with a revolving concavo-convex furrow-opening disk set at an angle to the line of draft, of a laterally-flattened depositing-tube in fixed relation to said disk, located back of the convex side and near the rear edge thereof, said tube being of substantially equal width throughout its length from front to rear, except for a slight rearward and downward inclination of the lower part of the front edge, the median axis of said tube being substantially straight and vertical when viewed from the side, or lying in a plane transverse to the line of draft, the lower part of the median axis of said tube being bent or curved laterally to approximately the same curvature as the adjacent convex side of the disk, said tube having an interior passage without inward projections or shoulders and without constrictions of the main part or body of said passage, and having an exclusively downward and rearward discharge-outlet at its lower end, said lower end being formed for that purpose with an upward and rearward inclination, and the lower part of said tube being formed at its forward edge into an angle one edge of which lies against the disk, the side of the tube rearward of said edge being clear of or separated from the disk to form a clearance-space, substantially as described.

6. In a grain-drill, the combination, with a revolving concavo-convex furrow-opening disk set at an angle to the line of draft, of a laterally-flattened depositing-tube in fixed relation to said disk, located back of the convex side and near the rear edge thereof, said tube being of substantially equal width throughout its length from front to rear, except for a slight rearward and downward inclination of the lower part of the front edge, the median axis of said tube being substantially straight and vertical when viewed from the side, or lying in a plane transverse to the line of draft, the lower part of the median axis of said tube being bent or curved laterally to approximately the same curvature as the adjacent convex side of the disk, said tube having an interior passage without inward projections or shoulders and without constrictions of the main part or body of said passage, and having an exclusively downward and rearward discharge-outlet at its lower end, said lower end being formed for that purpose with an upward and rearward inclination, said inclination being in the nature of an upward and rearward concave or reëntrant curve provided with a convex or salient curved portion slightly in advance of the heel of the tube, substantially as described.

7. In a grain-drill, the combination, with a revolving concavo-convex furrow-opening disk set at an angle to the line of draft, of a laterally-flattened depositing-tube in fixed relation to said disk, located back of the convex side and near the rear edge thereof, said tube being of substantially equal width throughout its length from front to rear, except for a slight rearward and downward inclination of the lower part of the front edge, the median axis of said tube being substantially straight and vertical when viewed from the side, or lying in a plane transverse to the line of draft, the lower part of the median axis of said tube being bent or curved laterally to approximately the same curvature as the adjacent convex side of the disk, said tube having an interior passage without inward projections or shoulders and without constrictions of the main part or body of said passage, and having an exclusively downward and rearward discharge-outlet at its lower end, the major axis of the interior opening of the lower part of the tube lying in the line of draft, substantially as described.

8. In a grain-drill, the combination, with a revolving concavo-convex furrow-opening disk set at an angle to the line of draft, of a laterally-flattened depositing-tube in fixed relation to said disk, located back of the convex side and near the rear edge thereof, said tube being of substantially equal width throughout its length from front to rear, except for a slight rearward and downward inclination of the lower part of the front edge, the median axis of said tube being substantially straight and vertical when viewed from the side, or lying in a plane transverse to the line of draft, the lower part of the median axis of said tube being bent or curved laterally to approximately the same curvature as the adjacent convex side of the disk, said tube having an interior passage without inward projections or shoulders and without constrictions of the main part or body of said passage, and having an exclusively downward and rearward discharge-outlet at its lower end, the lower part of said tube having the forward portions of its side walls converging to form an acute angle the point of which lies adjacent to the disk, substantially as described.

9. In a grain-drill, the combination, with a revolving concavo-convex furrow-opening disk set at an angle to the line of draft, of a laterally-flattened depositing-tube in fixed relation to said disk, located back of the convex side and near the rear edge thereof, said tube being of substantially equal width throughout its length from front to rear, except for a slight rearward and downward inclination of the lower part of the front edge, the median axis of said tube being substantially straight and vertical when viewed from the side, or lying in a plane transverse to the line of draft, the lower part of the median axis of said tube being bent or curved laterally to approximately the same curvature as the adjacent convex side of the disk, said tube having an interior passage without inward projections or shoulders and without constrictions of the main part or body of said passage, and having an exclusively downward and rearward discharge-outlet at its lower end, the lower part of said tube being formed at its forward edge with a longitudinal rib having an extended surface in slight contact with the disk, said side of the tube rearward from said rib standing clear of or away from the disk to form a clearance-space, substantially as described.

10. In a grain-drill, the combination, with a revolving concavo-convex furrow-opening disk set an angle to the line of draft, of a laterally-flattened depositing-tube in fixed relation to said disk, located back of the convex side and near the rear edge thereof, said tube being of substantially equal width throughout its length from front to rear, except for a slight rearward and downward inclination of the lower part of the front edge, the median axis of said tube being substantially straight and vertical when viewed from the side, or lying in a plane transverse to the line of draft, the lower part of the median axis of said tube being bent or curved laterally to approximately the same curvature as the adjacent convex side of the disk, said tube having an interior passage without inward projections or shoulders and without constrictions of the main part or body of said passage, and having an exclusively downward and rearward discharge-outlet at its lower end, said lower end being formed for that purpose with an upward and rearward inclination, said inclination being in the nature of an upward and rearward concave or reëntrant curve having a convex or salient curved portion at the point where the edges of the tube and of the disk coincide, and the opening of the tube extending back of said point in a continuation of the main reëntrant curve, substantially as described.

11. In a grain-drill, the combination, with a revolving concavo-convex furrow-opening disk set at an angle to the line of draft, of a depositing-tube in fixed relation to said disk, located back of the convex side and near the rear edge thereof, the lower end of said tube being formed with an upward and rearward inclination, and the lower part of said tube being formed at its forward edge into an angle one edge of which lies against the disk, the side of the tube adjacent to the disk rearward of said edge being clear of or separated from the disk to form a clearance-space, substantially as described.

12. In a grain-drill, the combination, with a revolving concavo-convex furrow-opening disk set at an angle to the line of draft, of a depositing-tube in fixed relation to said disk, located back of the convex side and near the rear edge thereof, the lower part of the said tube having its forward edge formed with a slight rearward and downward inclination, said edge being formed into an angle one edge of which lies against the disk, the side of the tube adjacent to the disk rearward of said edge being clear of or separated from the disk to form a clearance-space, and the lower end of the tube being formed with an upward and rearward inclination, substantially as described.

In testimony whereof we affix our signatures in the presence of two witnesses.

CHARLES R. CRAIN.
LOUIS C. EVANS.
HARRY E. DODSON.

Witnesses:
J. S. CRAIN,
C. C. KIRKPATRICK.